United States Patent [19]

Bailey et al.

[11] 4,030,641

[45] June 21, 1977

[54] IMPLEMENTS FOR DELIVERING PARTICULATE MATERIAL TO THE GROUND

[75] Inventors: Alfred J. Bailey, Berkswell; Malcolm Dean, Green Lane, both of England

[73] Assignee: Massey-Ferguson Services N.V., Curacao, Netherlands Antilles

[22] Filed: July 11, 1975

[21] Appl. No.: 595,208

[30] Foreign Application Priority Data

Aug. 7, 1974 United Kingdom ............. 34756/74

[52] U.S. Cl. .............................. 222/317; 222/504; 92/13.8; 239/687
[51] Int. Cl.² .................. A01C 17/00; E01C 19/20; F01B 31/00
[58] Field of Search ........... 222/317, 504; 239/676, 239/687; 92/13.8

[56] References Cited

UNITED STATES PATENTS

| | | | |
|---|---|---|---|
| 1,207,251 | 12/1916 | Wettengel | 222/504 |
| 2,723,782 | 11/1955 | Dwyer | 222/504 X |
| 3,586,246 | 6/1971 | Van Der Lily et al. | 239/665 |
| 3,815,480 | 6/1974 | Spyra | 92/13.8 X |
| 3,905,523 | 9/1975 | Ahlers et al. | 222/504 |
| 3,931,934 | 1/1976 | Smith | 239/676 X |

FOREIGN PATENTS OR APPLICATIONS

| | | | |
|---|---|---|---|
| 1,910,372 | 9/1970 | Germany | 239/676 |
| 1,055,249 | 1/1967 | United Kingdom | 239/676 |

Primary Examiner—Stanley H. Tollberg
Assistant Examiner—Frederick R. Handren
Attorney, Agent, or Firm—Robert L. Farris

[57] ABSTRACT

A spreader for fertilizer or similar material has a metering mechanism for said material to vary the rate of spreading. The metering mechanism has two metering members in face-to-face contact defining a metering opening. A hydraulic ram moves the metering members so as to open and close the opening. An adjustable stop within the ram allows the ram's stroke to be changed. This changes the extent to which the ram can open the opening so that the ram can be supplied with fluid under sufficient pressure to overcome possible corrosion between the metering members.

3 Claims, 7 Drawing Figures

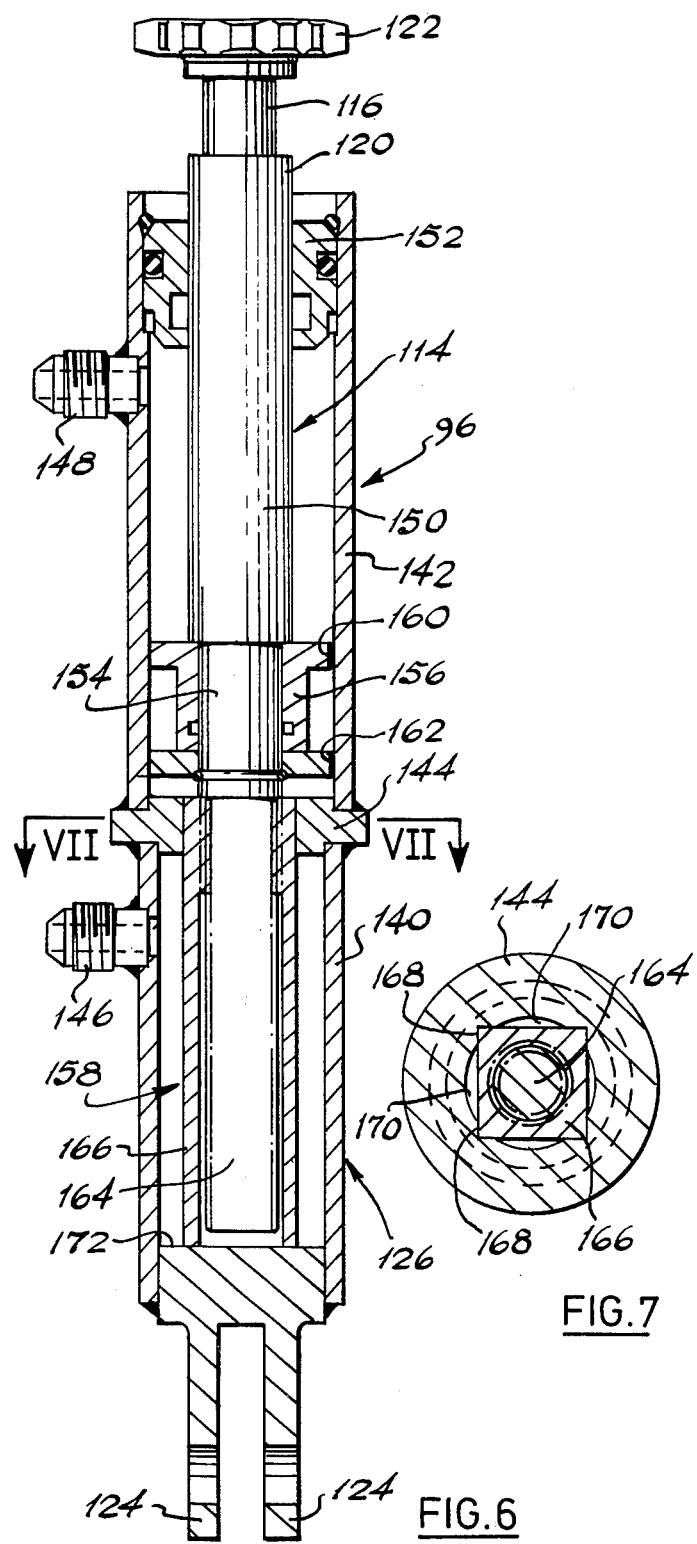

IMPLEMENTS FOR DELIVERING PARTICULATE MATERIAL TO THE GROUND

This invention relates to implements for delivering particulate material to the ground and in particular, though not exclusively, to such implements in the form of so-called spinner broadcasters for agriculture. In a spinner broadcaster, particulate material, such as fertilizer, from a hopper is fed through a metering device into a scattering mechanism which scatters or broadcasts the material onto the ground.

A problem which has arisen in the case of spinner broadcasters is that in the past the metering mechanism has been provided with direct manual controls whereby, in use, the driver of the tractor coupled to the spinner broadcaster could open and close the metering mechanism or vary the rate of flow of material therethrough by merely reaching rearwards from his tractor seat. The introduction of cabs on tractors has made it much more difficult for such direct manual controls on a spinner broadcaster to be reached by a tractor driver.

In U.K. Pat. No. 1,055,250 there is proposed a vehicle for spreading grit or salt on roads having a hydraulic ram to operate a metering mechanism in the form of a gate. In use, the degree of opening of the gate, and therefore the rate of spreading of the grit or salt, is controlled by controlling the supply of fluid to the ram by means of a valve. When the gate has been opened to the desired extent by the ram, the gate is locked in that position by using the valve to isolate the ram from the remainder of the hydraulic circuit.

The arrangement proposed in U.K. Pat. No. 1,055,250 suffers from the disadvantage that, as in almost all spinner broadcasters, the metering mechanism tends to become stuck or jammed. This arises from the fact that the metering mechanism of spinner broadcasters usually comprises a pair of metering members in face to face contact, which together define a metering orifice or gate. The size of the orifice can be varied by effecting relative movement of the metering members. Such relative movement is used to open and close the metering mechanism and to vary the rate of flow of material therethrough. However, owing to the large area of contact between the metering members arising from their face-to-face contact, and owing also to the corrosive nature of the fertilizers ofen metered thereby, and the difficulty of washing all such fertilizer away after use, it usually happens that corrosion occurs between the metering members. This makes it very difficult to move them after the spinner broadcaster has been lying idle for a few days. The degree of resistance to such movement at any given time depends on the design of the metering members, their total area of contact, the material from which they are made or surfaced and its resistance to corrosion, the nature of the material last spread by the spinner broadcaster, whether the metering members were thoroughly washed after their last use, the length of time which has elapsed since the spinner broadcaster was last used — and on other factors. Clearly therefore the resistance to movement provided by the metering members will vary from day to day.

Accordingly, it will be appreciated that control of the metering mechanism in a spinner broadcaster in the manner proposed in U.K. Pat. No. 1,055,250 will be unsatisfactory since in the absence of visual inspection of the metering mechanism it will be impossible to know to what extent the metering members have been moved by a given manipulation of the valve controlling the ram.

An object of the present invention is to provide an implement for delivering particulate material to the ground having metering members in face-to-face contact wherein a predetermined degree of movement of the metering members can be produced by remote control.

According to the invention there is provided an implement for delivering particulate material to the ground comprising a metering mechanism for the particulate material, the metering mechanism comprising metering members in face to face contact and capable of defining an opening, the metering members being mounted so as to be movable relative to each other whereby the size of said opening may be varied, characterized by the combination of a thrust device connected to the metering mechanism and actuable by fluid pressure to effect said relative movement of the metering members, and an adjustable stop effective to permit only a selected amount of said relative movement.

The provision of a thrust device actuable by fluid pressure in combination with an adjustable stop to limit movement of the metering members allows the degree of movement of the metering members determined by the setting of the stop to be achieved regardless of the resistance to movement of the face-to-face metering members, since the thrust device can be arranged to provide in all circumstances sufficient thrust to overcome the resistance.

An embodiment of the invention will now be described by way of example with reference to the accompanying drawings in which:

FIG. 6 shows a longitudinal section through a hydraulic ram forming part of the spinner broadcaster of FIG. 1; and FIG. 7 shows a cross section through the ram of FIG. 6 on the VII—VII in FIG. 6.

Figure 1:
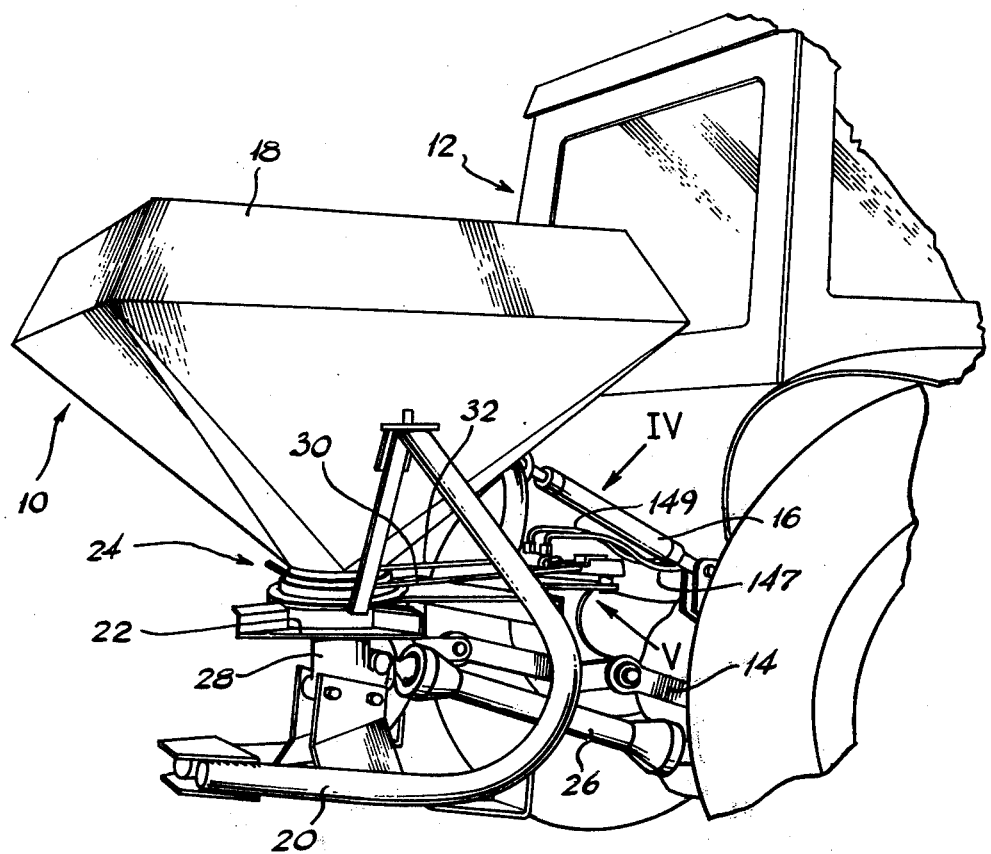
FIG. 1 shows a perspective view from the rear and to one side of a spinner broadcaster mounted on a tractor.

As shown in FIG. 1, an implement for delivering particulate material to the ground in the form of a spinner broadcaster 10 is mounted on a tractor 12 by means of the tractor's draught links 14 and its top control link 16, in the usual manner.

Spinner broadcaster 10 comprises a pyramidal sheet metal hopper 18 mounted on a tubular frame 20, a spreading or scattering mechanism comprising a rotatable spreading disc 22 and a metering mechanism 24 to allow the passage of particulate material from the hopper 18 to disc 22 at a desired rate.

Spreading disc 22 is driven from the power take-off shaft of the tractor through an enclosed shaft 26 having universal joints, and through a gearbox 28.

Metering mechanism 24 is controlled by a pair of control rods 30, 32 in a manner which will be more fully described later.

Figure 2:
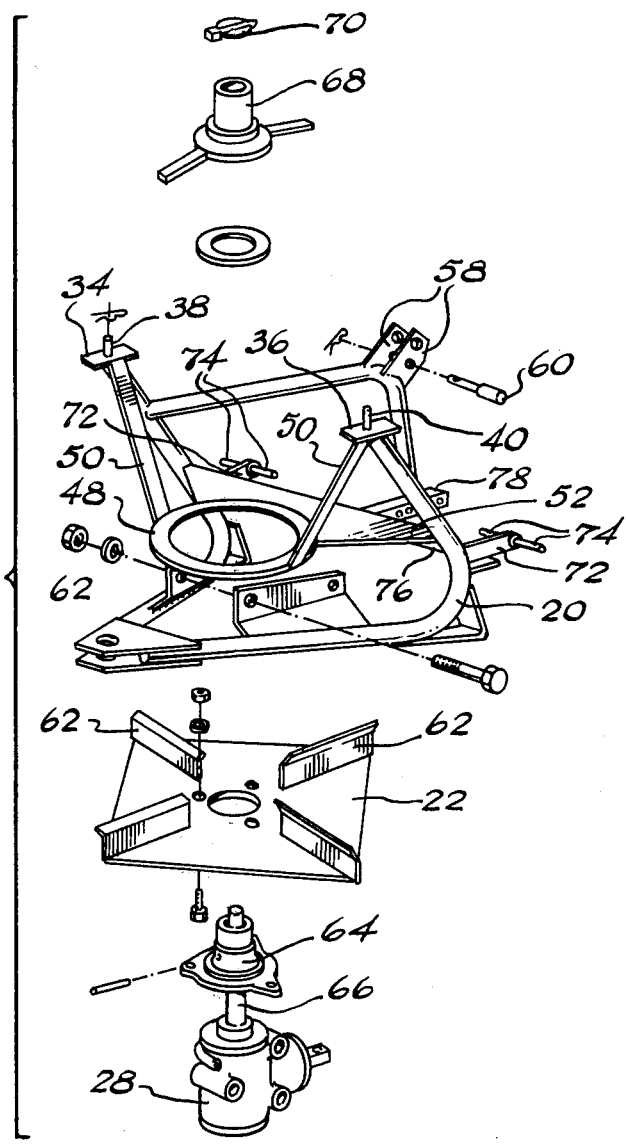
FIG. 2 shows an exploded perspective view of certain parts of the spinner broadcaster of FIG. 1.
Figure 3:
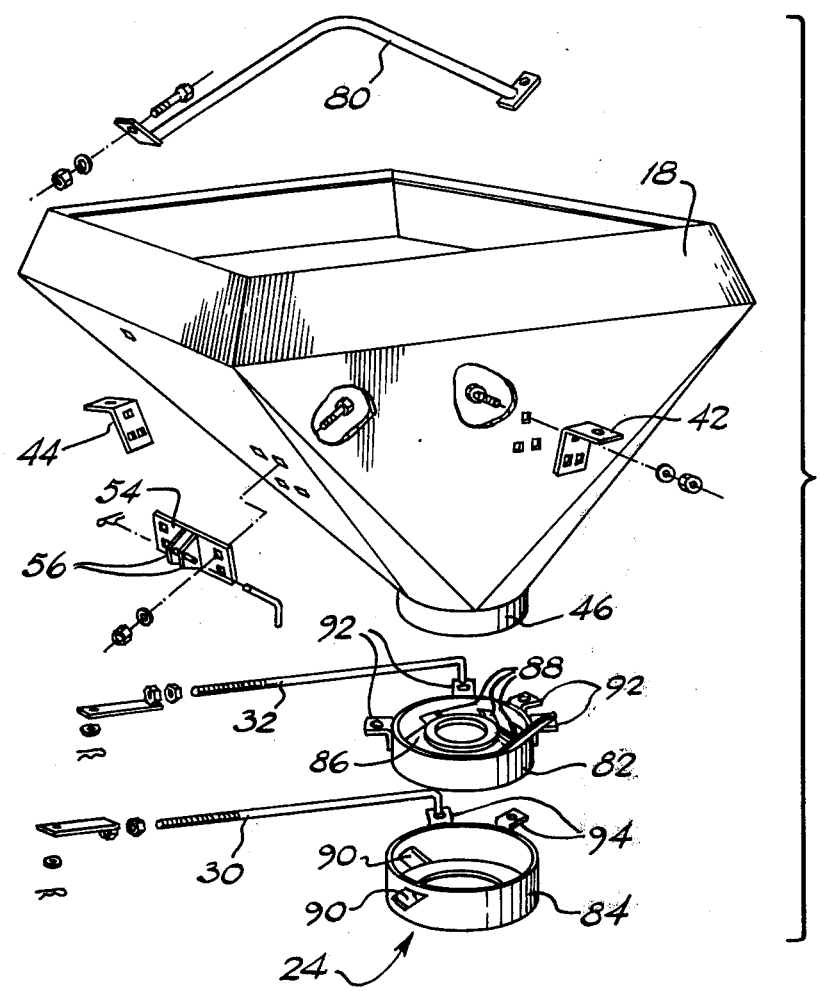
FIG. 3 shows an exploded perspective view of certain other parts of the spinner broadcaster of FIG. 1.

FIGS. 2 and 3 show the structure of hopper 18, frame 20, spreading disc 22 and gearbox 28 more clearly. As can be seen, frame 20 carries a pair of hopper support plates 34, 36 each having an upstanding apertured spigot 38, 40 respectively. These plates and spigots engage a pair of apertured brackets 42, 44 (see FIG. 3) bolted to opposite sides of hopper 18. The hopper is further located by means of a collar 46 formed intergrally therewith which fits within an annular flange 48. Flange 48 is carried by arms 50 and a tapering flanged plate 52 on frame 20. At the front of the hopper, a bracket 54 bolted thereto has a pair of flanges 56 which fit between a pair of plates 58 welded to frame 20 and are secured thereto by a pin 60. Plates 58 also provide a connection for the top link 16 of the tractor.

Spreading disc 22 carries four upstanding diagonal vanes 62 and is bolted to a driving collar 64 carried on the output shaft 66 of gear box 28. An agitator 68 is secured to shaft 66 by a lynch pin 70 above disc 22 and within hopper 18 to ensure an even flow of particulate material to the disc.

Frame 20 carries a pair of forwardly projecting brackets 72 each having dual category transverse pins 74 to receive the tractor draught links 14.

A downwardly-projecting flange 76 at the forward edge of plate 52 has rigidly secured thereto an apertured forwardly-projecting box section member 78 for a purpose to be described.

As shown in FIG. 3, hopper 18 has a tubular stiffening member 80 bolted inside it.

Below hopper 18, metering mechanism 24 comprises a pair of drum or bowl shaped nesting metering members 82, 84. The upper metering bowl 82 fits closely within the lower bowl 84 and has a truncated conical member 86 constituting the bottom of the bowl (and the bottom of hopper 18) which guides the particulate material towards parallelogram-shaped openings or ports 88 of differing sized formed in the cylindrical side wall of the bowl. Corresponding openings 90 are formed in the side wall of lower bowl 84.

The side walls of metering bowls 82, 84 are in face-to-face contact, but the bowls are nevertheless free to move angularly relative to each other about their common axis. To effect such movement, the bowls 82, 84 are each formed with a series of apertured lugs 92, 94 respectively for engagement with control rods 32, 30 respectively. The series of lugs 92 correspond to the series of openings 88 in upper bowl 82, and the series of lugs 94 correspond to the openings 90 in lower bowl 84. Selection of an appropriate pair of lugs for engagement with rods 30, 32 brings a pair of openings of appropriate size into overlapping relationship. Relative movement of rods 30, 32 changes the degree of overlap of the openings and therefore changes the effective size of the port through which the particulate material flows onto spreading disc 22.

To effect relative movement of control rods 30, 32 there is provided an actuating mechanism shown in FIGS. 4 to 7. The actuating mechanism comprises a thrust device in the form of a double-acting hydraulic ram 96 connected through an arm 98 to a bell crank lever 100 to which rods 30, 32 are pivotally connected.

Figure 5:
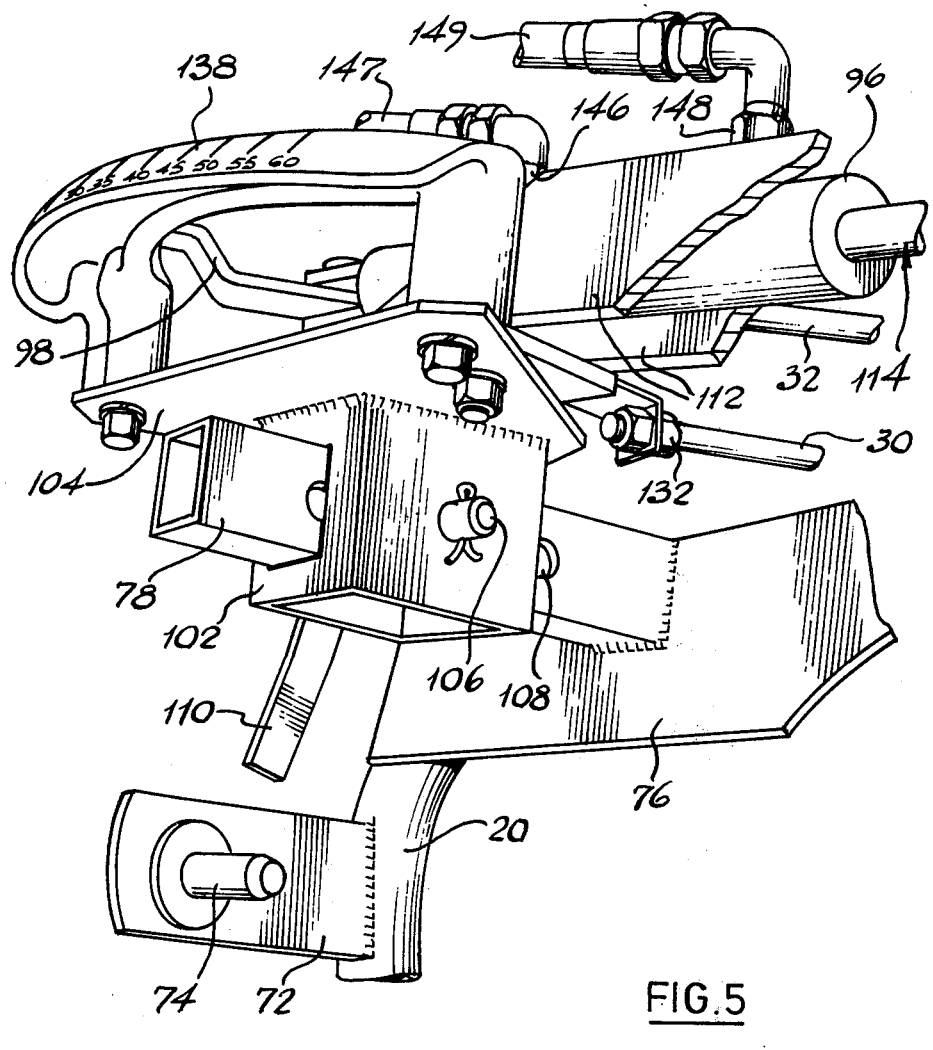
FIG. 5 shows a perspective view from below and in the direction indicated by arrow V in FIG. 1 of the same portion of the spinner broadcaster of FIG. 1 and also on a larger scale.

The entire actuating mechanism is mounted on box section member 78 as shown in FIG. 5. An adjustment 102 having a horizontal mounting plate 104 welded thereto is slidably mounted on box section member 78. The adjustment member is located in a chosen position along the length of the section member 78 by passing a pin 106 through a pair of aligned apertures in the adjustment member and through one of a series of aligned apertures 108 in the box section member. Pin 106 has a handle 110. Thus the entire actuating mechanism can be adjusted in the position towards and away from the metering mechanism 24, for a purpose to be described.

Ram 96 is carried at one end on mounting plate 104 by a yoke 112 fixed to the mounting plate. Piston rod 114 of the ram has a reduced diameter end portion 116 (see FIG. 6) which is freely journalled in the yoke for rotation about the longitudinal axis of the rod. The piston rod is held against axial movement relative to yoke 112 by a trunnion 118 fixed to the yoke and through which portion 116 of the piston extends. Trunnion 118 is itself located between a shoulder 120 on the piston rod and a hand wheel 122 fixed to the end of the piston rod.

The other end of ram 96 is supported by means of a pair of lugs 124 formed at the end of the cylinder 126 of the ram. A pivot pin 128 connects lugs 124 to arm 98, which is itself pivotally supported on mounting plate 104 by means of a pin 130. The upper and lower plates constituting bell crank lever 100 are welded to arm 98. Control rods 30, 32 are pivotally connected to the bell crank lever through screw threaded adjusters 132, 134. The forward end of arm 98 is formed with a pointer 136 to move over a graduated scale 138 fixed to mounting plate 104.

The internal structure of ram 96 is shown in FIGS. 6 and 7. As shown, cylinder 126 comprises first and second cylinder portions 140, 142 of slightly different internal diameter and joined by a collar 144 welded thereto. Hydraulic fluid connectors 146, 148 are provided for each cylinder portion together with associated hoses 147 and 149 respectively.

Piston rod 114 is a multipiece structure comprising an exposable portion 150 received in an oil seal 152, a reduced diameter central portion 154 carrying a piston element 156, and a screw threaded end portion 158 constituting a stop member.

Piston element 156 has spaced lands 160, 162. End portion 158 of piston rod 114 comprises interengaging second and first screw-threaded members in the form of a central screw-threaded rod 164 integral with central portion 154 of the piston rod, and an internally screw-threaded sleeve 166 respectively. Sleeve 166 is square in external cross-sectional shaped and is a sliding fit in collar 144 by means of four notches 168 formed at the circular inner periphery of the collar. Sleeve 166 is thereby held against rotation relative to collar 144 and cylinder 126 but is free to slide in the axial direction. Collar 144 constitutes retaining means for the sleeve. Fluid communication through collar 144 is provided through the four ports 170 defined by sleeve 166 and collar 144.

Use of the spinner broadcaster will now be described.

Figure 4:
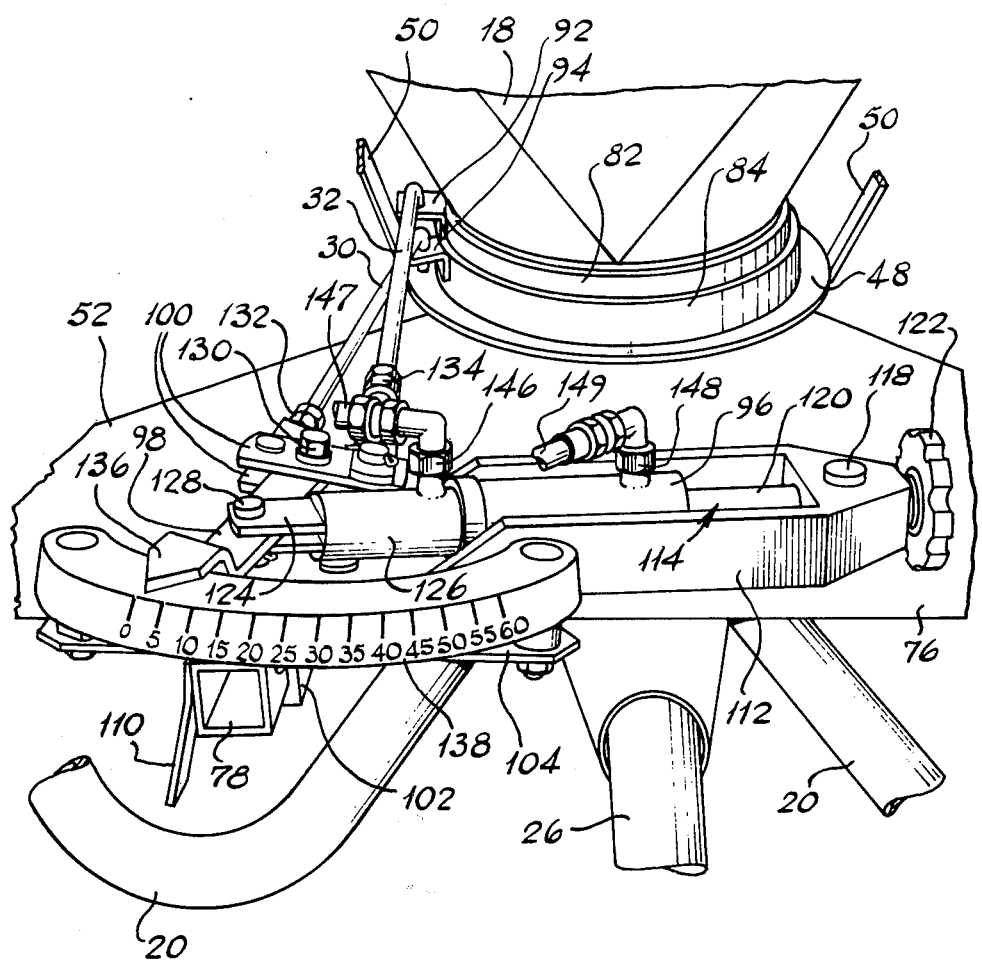
FIG. 4 shows a perspective view from above and in the direction indicated by arrow IV in FIG. 1 of a portion of the spinner broadcaster of FIG. 1, on a larger scale.

When ram 96 is fully extended (as shown in FIG. 4), the openings 88 and 90 in metering bowls 82, 84 just do not overlap and no flow of particulate material from hopper 18 onto spreading disc 22 occurs.

When it is desired to start spreading material, spreading disc 22 and agitator 68 are rotated by the p.t.o. shaft of the tractor and hydraulic fluid is pumped through connector 148 of ram 96 to retract piston 114.

Sleeve 166 engages the inner end 172 of the cylinder to define the retracted position of the piston rod 114.

Retraction of piston rod 114 moves arm 98 and causes bell crank 100 to effect relative movement of control rods 30, 32 thereby opening the port defined by openings 88 and 90 in metering bowls 82, 84. Particulate material passes through the port onto the rapidly rotating spreading disc 22 and is thereby spread on the ground.

To change the size of the port defined by openings 88 and 90, hand wheel 122 is turned to rotate threaded rod 164 relative to sleeve 166. This changes the effective length of piston rod 114. The longer the rod, the shorter is the stroke of the piston and therefore the smaller the size of the metering port. Rod 164 constitutes an adjustment member and together with sleeve 166 provides an adjustable stop effective to control the size of the spinner broadcater's metering port during use.

The direction of scatter produced by spreading disc 22 may be varied by changing the position of the metering port relative to the implement as a whole by moving adjustment member 102 along box section member 78. This moves control rods 30, 32 and bowls 82, 84 equally in the same direction and therefore moves the port angularly with respect to the direction of movement of the implement.

It will be appreciated that the above embodiment of the invention provides remote control of the metering mechanism of the spinner broadcaster. Ram 96 provides ample thrust to overcome resistance to relative movement of bowls 82, 84 due to friction and corrosion. The effective length of the ram and therefore the size of the metering port is dependent only upon the setting of hand wheel 122. This setting is easily carried out before work is commenced by reference to the position of pointer 136 on scale 138 when the ram is fully retracted.

The adjustable stop provided by rod 164 and sleeve 166 is entirely within the ram and is therefore completely protected from the corrosive influence of the materials spread by the spinner broadcaster.

In the embodiment of the invention described above, the metering members are in the form of a pair of apertured bowls which fit one within the other. It is to be understood that in accordance with the invention, the metering members may be in other forms. For example they may be in the form of flat plates, both apertured or only one apertured. Alternatively the opening could be defined by the edges of two or more overlapping plate-like metering members in the manner of an iris in a photographic camera. The metering members may be mounted so that the particulate material flows through the opening defined thereby in a vertical direction or in a horizontal direction or in any direction therebetween. The common factor between all these forms of metering members is that, in use, they are mounted in face-to face contact – as opposed to edge-to-edge or edge-to- edge contact – and therefore have relatively large surface areas in contact with each other. In metering mechanisms where face-to-face contact between metering members does not occur, and particularly where one of the metering members is power-driven so as to assist in the metering action (for example by effecting agitation of the particulate material), the problem with which the present invention is concerned does not arise.

We claim:

1. An implement for spreading particulate material on the ground comprising a frame, a hopper mounted on the frame for the particulate material, a spreading mechanism mounted on the frame below the hopper, and a metering mechanism supported on the frame to control the rate of passage of the particulate material from the hopper to the spreading mechanism, the metering mechanism comprising metering members in face-to-face contact defining at least one opening for the passage of particulate material from the hopper to the spreading mechanism, the metering members being supported on the frame for pivotal movement about a generally vertical axis and movable relative to each other to infinitely vary the size of said opening from closed to fully open, a double-acting hydraulic ram operably connected to the metering members to position the metering members relative to each other, a setting indicator to indicate the position of the metering members relative to each other and adjustable mounting means mounting the double-acting hydraulic ram on the frame, for adjusting the position of said opening relative to the spreading mechanism.

2. An inplement for spreading particulate material on the ground comprising a frame, a hopper mounted on the frame for the particulate material, a spreading mechanism mounted on the frame below the hopper, and a metering mechanism supported on the frame to control the rate of passage of the particulate material from the hopper to the spreading mechanism, the metering mechanism comprising metering members in face-to-face contact defining at least one opening for the passage of particulate material from the hopper to the spreading mechanism, the metering members being mounted so as to be movable relative to each other to infinitely vary the size of said opening from closed to fully open, a double-acting hydraulic ram mounted on the frame, lever means operably connected to the metering members and the double acting hydraulic cylinder to position the metering members relative to each other, and adjustment means for adjusting the position of the double-acting hydraulic cylinder relative to the frame to adjust the position of said opening relative to the spreading mechanism.

3. The implement of claim 2 for spreading particulate material wherein the metering members are supported on the frame for pivotal movement about a generally vertical axis.

* * * * *